(12) United States Patent
Lam et al.

(10) Patent No.: US 8,204,923 B1
(45) Date of Patent: Jun. 19, 2012

(54) SYSTEMS AND METHODS FOR SCALING PARAMETERS

(75) Inventors: Stephen N. Lam, Los Altos, CA (US); Pui Shan Wong, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1045 days.

(21) Appl. No.: 11/590,938

(22) Filed: Oct. 31, 2006

(51) Int. Cl.
*G06F 7/00* (2006.01)

(52) U.S. Cl. ........................................ 708/200; 708/208

(58) Field of Classification Search .................. None
See application file for complete search history.

(56) References Cited

U.S. PATENT DOCUMENTS

| | | | | |
|---|---|---|---|---|
| 5,264,924 A | * | 11/1993 | Cok | 348/624 |
| 5,568,518 A | * | 10/1996 | Dent | 375/340 |
| 6,952,561 B1 | * | 10/2005 | Kumar et al. | 455/63.1 |
| 7,027,532 B2 | * | 4/2006 | Lauer | 375/341 |
| 7,180,932 B1 | * | 2/2007 | Heinila et al. | 375/147 |
| 2007/0019752 A1 | * | 1/2007 | Kim | 375/260 |

* cited by examiner

*Primary Examiner* — Lewis A Bullock, Jr.
*Assistant Examiner* — Michael D Yaary

(57) ABSTRACT

The disclosed technology provides a system and a method for scaling parameters in a real-time computation system. A real-time computation system can receive a plurality of input data. The real-time computation system can determine a scaling factor based on an input data, and the scaling factor can be used in connection with a subsequent input data. When a new input data arrives, the real-time computation system can, in parallel, determine a new scaling factor based on the new input data and compute output values based on the existing scaling factor and the new input data. In one aspect of the invention, the real-time computation system can be a statistical signal processing system, which can compute output values, at least in part, using look-up tables.

17 Claims, 13 Drawing Sheets

SYSTEMS AND METHODS FOR SCALING PARAMETERS

BACKGROUND OF THE INVENTION

This invention relates to real-time computation systems and, more particularly, to scaling the value of parameters in real-time computation systems.

Computation systems that perform binary computations involve implementation issues such as bit precision. Bit precision refers to the number of bits that are available to represent a value's whole and/or decimal parts. A greater bit precision allows a larger range of values to be represented. For example, suppose the notation $U(w\cdot\text{-}d)$ indicates that w bits are used to represent the whole part of a value, and d bits are used to represent the decimal part of a value. The w bits can represent $0, 1, 2, \ldots, 2^w-1$ for the whole part of a value, and the d bits can represent decimal values in increments of $\frac{1}{2}^d$. In some cases, the w bits can use one bit as a sign indicator, so that the w bits can represent $0, \pm 1, \pm 2, \ldots, \pm 2^{w-1}, -2^w$ for the whole part of a value. The sum $(w+d)$ will be referred to herein as "bit width."

The bit width for all binary computation systems is finite. Therefore, binary computation systems can only represent a finite range of whole and/or decimal values. When computations involve the use of values that are outside this finite range, such computations cannot be accurately represented and the computation can be incorrect. This condition will be referred to herein as "overflow." One way to mitigate the effects of overflow includes scaling each value used in the computation by a scaling factor to bring all of the values into the range represented by the bit width. In some situations, the same scaling factor can be used regardless of the values in the computation. However, in other situations, it may be more beneficial to use a dynamic scaling factor for each computation that is based on the values used in that computation. In this situation, the computation is especially time consuming because it must wait for the dynamic scaling factor to be determined, and then, afterwards, perform the computation based on the dynamic scaling factor.

The use of a dynamic scaling factor can be time consuming and may present unacceptable computation latencies, especially in real-time computation systems. As used herein, the term "real-time computation system" refers to a system that performs the computation of input according to a specific function and generates output accurately within a specific amount of time. For example, in some real-time computation systems, the stream of output values may need to be produced almost instantaneously (e.g., in a fraction of a second) after receiving input values. Real-time computation system may need dynamic parameter scaling to mitigate the effects of overflow, despite latency concerns associated with dynamic parameter scaling. Accordingly, there is interest in reducing the latency incurred when scaling parameters in real-time computation systems.

SUMMARY OF THE INVENTION

The disclosed technology provides a system and method for scaling the value of parameters in real-time computation systems.

A real-time computation system can receive first data, second data, third data, and so on. The first data can be received before the second data, the second data can be received before the third data, and so on. In accordance with one aspect of the invention, a scaling factor can be determined based on earlier-received data, and the determined scaling factor can be used in connection with later-received data. Furthermore, in parallel with using the scaling factor in connection with the later-received data, another scaling factor can be determined based on the later-received data for use in connection with data received after the later-received data. For example, the real-time computation system can determine a first scaling factor based on the first data. The real-time computation system can, in parallel, compute output data based on the first scaling factor and the second data, and determine a second scaling factor based on the second data. Then, the real-time computation system can, in parallel, compute output data based on the second scaling factor and the third data, and determine a third scaling factor based on the third data. This parallel processing can continue for input data received after the third data, as well.

A real-time computation system may be a statistical signal processing system that involves a division computation. In accordance with one aspect of the invention, the statistical signal processing system can include a table that includes a number of table locations, where each table location can correspond to a distinct number, and a division computation circuit that computes a quotient for each of the table locations based on a scaling factor and the distinct value for the table location, wherein each quotient is stored in its corresponding table location. The statistical signal processing circuit can include an input connection that receives an input value, and a table look-up circuit that accesses the table location corresponding to the distinct value that equals the input value. The quotient stored in the accessed table location can then be used to perform various computations. In one embodiment, the statistical signal processing system can receive the scaling factor before it receives the input data.

A real-time computation system can include a means for receiving first data, second data, third data, and so on. The first data can be received before the second data, the second data can be received before the third data, and so on. In accordance with one aspect of the invention, the disclosed system can include a means for determining a scaling factor based on earlier-received data, and a means for using the determined scaling factor in connection with later-received data. Furthermore, in parallel with using the scaling factor in connection with the later-received data, the disclosed system can include a means for determining another scaling factor based on the later-received data for use in connection with data received after the later-received data. For example, the real-time computation system can include a means for determining a first scaling factor based on the first data. The real-time computation system can include a means for computing, in parallel, output data based on the first scaling factor and the second data, and a means for determining a second scaling factor based on the second data. The real-time computation system can include a means for computing, in parallel, output data based on the second scaling factor and the third data, and a means for determining a third scaling factor based on the third data. The disclosed system can include a means for continuing this parallel processing for input data received after the third data.

A real-time computation system may be a statistical signal processing system that involves a division computation means. In accordance with one aspect of the invention, the statistical signal processing system can include a means for creating a look-up table that includes a number of table locations, where each table location can correspond to a distinct number, and a means for computing a quotient for each of the table locations based on a scaling factor and the distinct value for the table location, wherein each quotient is stored in its corresponding table location. The statistical signal processing system can include a means for receiving an input value and a means for accessing the table location corresponding to the distinct value that equals the input value. The disclosed system can include a means for using the quotient stored in the accessed table location to perform various computations. In one embodiment, the statistical signal processing system can include a means for receiving the scaling factor before it receives the input data.

A computer program executing on a processor can perform the steps of receiving first data, second data, third data, and so on. The first data can be received before the second data, the second data can be received before the third data, and so on. In accordance with one aspect of the invention, a computer program executing on a processor can perform the steps of determining a scaling factor based on earlier-received data and using the determined scaling factor in connection with later-received data. Furthermore, a computer program executing on a processor can perform, in parallel, the steps of using the scaling factor in connection with the later-received data and determining another scaling factor based on the later-received data for use in connection with data received after the later-received data. For example, the computer program executing on a processor can perform the steps of determining a first scaling factor based on the first data, computing output data based on the first scaling factor and the second data, and determining, in parallel with computing output data, a second scaling factor based on the second data. Then, the computer program executing on a processor can perform the steps of computing output data based on the second scaling factor and the third data and determining, in parallel with computing output data, a third scaling factor based on the third data. The computer program executing on a processor can perform the steps necessary to continue this parallel processing for input data received after the third data.

A real-time computation system may be a statistical signal processing system that involves a division computation. In accordance with one aspect of the invention, a computer program executing on a processor can perform the steps of creating a look-up table that includes a number of table locations, where each table location can correspond to a distinct number, and computing a quotient for each of the table locations based on a scaling factor and the distinct value for the table location, wherein each quotient is stored in its corresponding table location. The computer program executing on a processor can perform the steps of receiving an input value and accessing the table location corresponding to the distinct value that equals the input value. The computer program executing on a process can perform the step of using the quotient stored in the accessed table location to perform various computations. In one embodiment, the computer program executing on a processor can perform the step of receiving the scaling factor before it receives the input data.

Further features of the invention, its nature and various advantages, will be more apparent from the accompanying drawings and the following detailed description of the various embodiments.

DETAILED DESCRIPTION

The disclosed technology provides a system and method for scaling the value of parameters in real-time computation systems.

Figure 1:
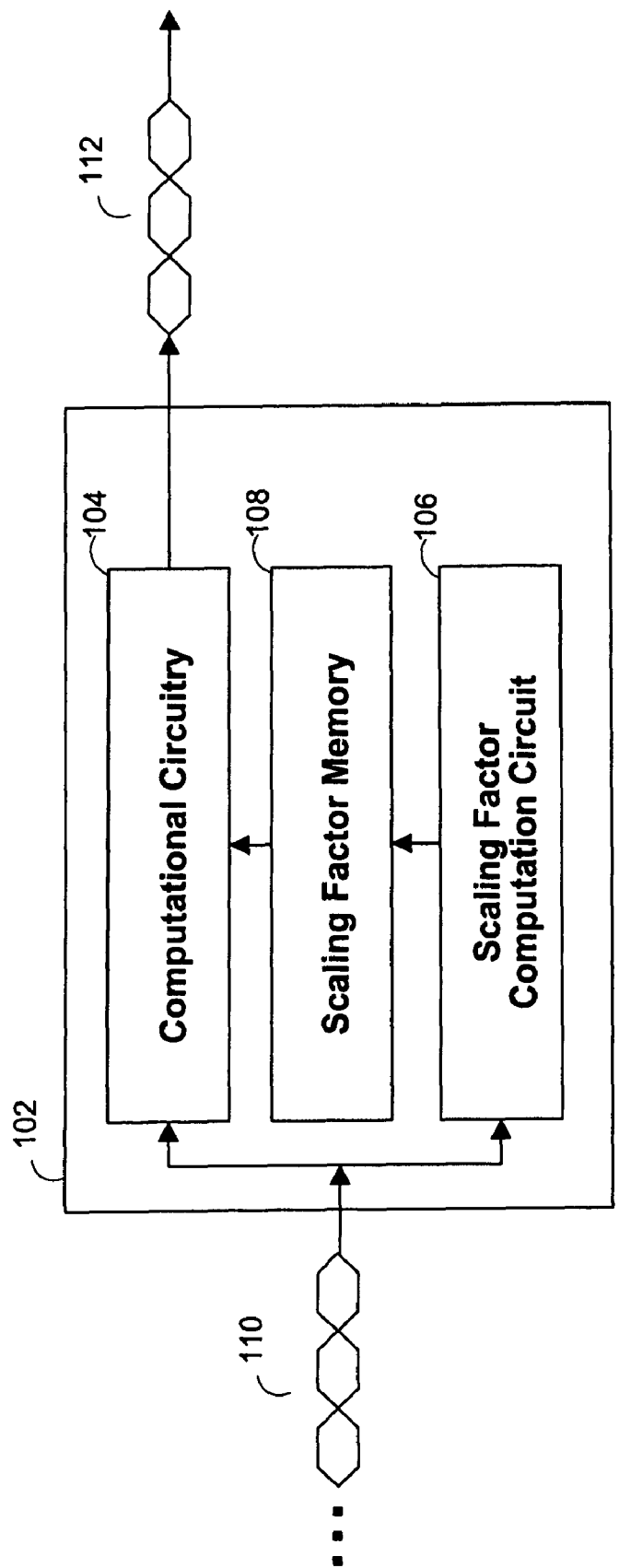
FIG. 1 is a block diagram of an exemplary real-time computation system that uses a scaling factor in accordance with one aspect of the invention.

Referring to FIG. 1, there is shown a block diagram of an exemplary real-time computation system 102 in accordance with one aspect of the invention. The real-time computation system 102 can use a scaling factor to mitigate the effects of overflow. As used herein, the term "overflow" refers to situations where values in the computation system 102 exceed the range of values that can be represented by the computation system 102. The range of values that can be represented depends on implementation factors such as bit width, which refers to the number of bits used for representing values. The notation $U(w\cdot-d)$ will be used to indicate that w bits are used to represent the whole part and/or the sign of a value, and d bits are used to represent the decimal part of the value. The sum (w+d) is the bit width for $U(w\cdot-d)$. The computation system 102 can use one bit width throughout or different bit widths at different portions of the computation system 102.

The real-time computation system 102 can include computation circuitry 104, a scaling factor computation circuit 106, and a scaling factor memory 108. The computation circuitry 104 can receive input data 110 and can operate to compute output data 112 based on the input data 110 and a scaling factor in the scaling factor memory 108. The scaling factor computation circuit 106 can determine a dynamic scaling factor based on the input data 110 and store the scaling factor in the scaling factor memory 108. In one embodiment, the input data 110 can arrive at the computation system 102 at a steady rate. In one embodiment, input data 110 may not arrive at the computation system 102 at a steady rate. An input data can be a single bit, a multi-bit value, or a grouping of single-bit or multi-bit values.

In accordance with one aspect of the invention, the scaling factor computation circuit 106 and the computation circuitry 104 can operate in parallel. When an input data 110 is received by the real-time computation system 102, the scaling factor computation circuit 106 can determine a dynamic scaling factor based on the input data 110 at the same time that the computation circuitry 104 computes an output data 112 based on the input data 110 and a scaling factor in the scaling factor memory 108. After the scaling factor computation circuit 106 determines a dynamic scaling factor, the scaling factor can be stored in the scaling factor memory 108 for use with subsequent input data 110. The disclosed technology is especially effective when consecutive input data exhibit similar characteristics, so that a scaling factor determined based on one input data would be similar to a scaling factor determined based on an adjacent input data. However, it is contemplated that the disclosed technology can also apply to situations where consecutive input data have different characteristics.

Figure 2:
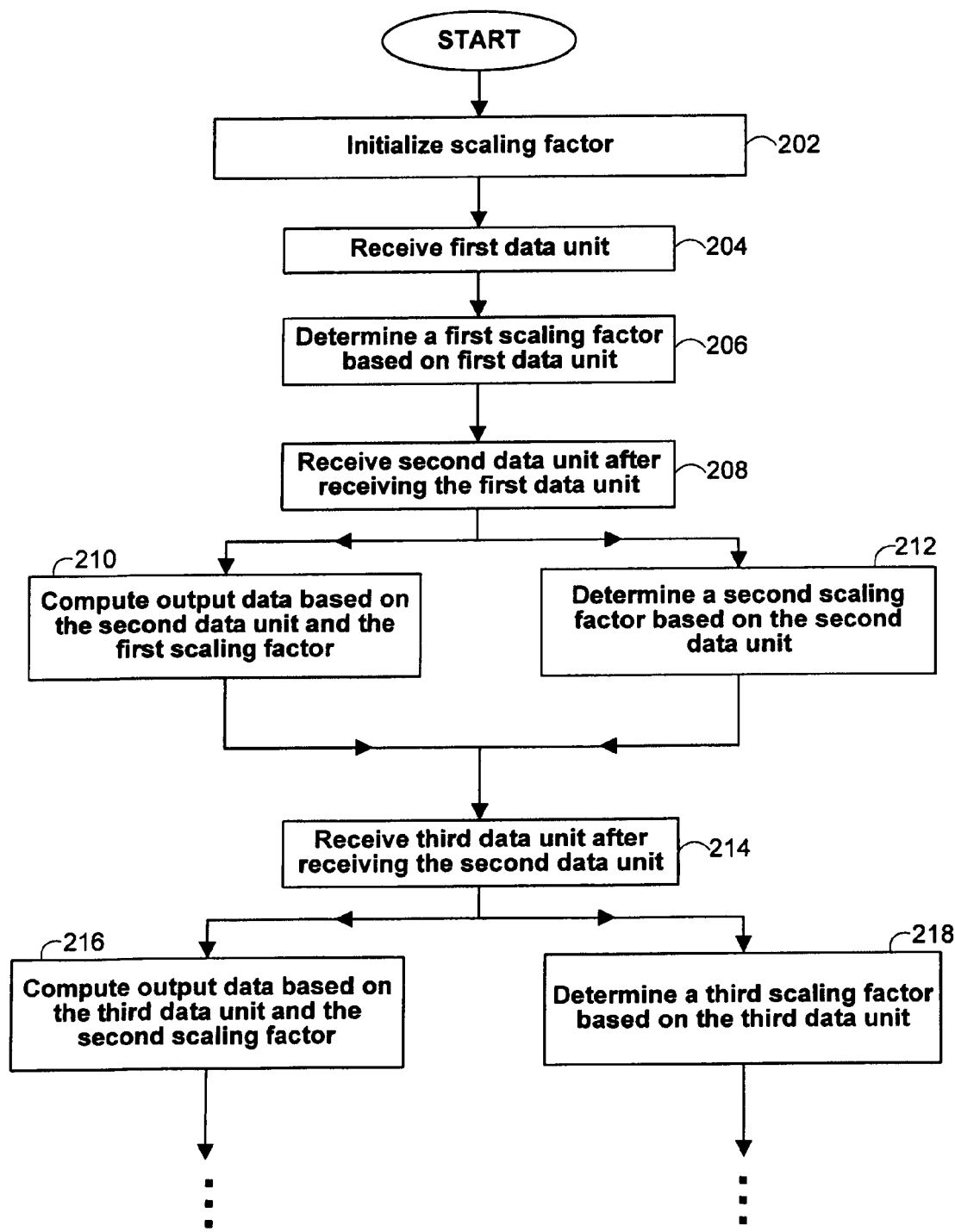
FIG. 2 is a flow diagram of an exemplary method for computing output data based on a scaling factor in accordance with one aspect of the invention.

FIG. 2 is a flow diagram describing a few iterations of this process. Initially, the scaling factor can be set to an initial value 202. The real-time computation system can receive first input data 204 and can determine a first scaling factor based on the first input data 206. Alternatively, in parallel with determining the first scaling factor, the real-time computation system can compute output data based on the first input data and the initial scaling factor. The real-time computation system can receive a second input data after receiving the first input data 208. In parallel, the real-time computation system can compute output data based on the second input data and the first scaling factor 210, and determine a second scaling factor based on the second input data 212. The real-time computation system can receive third input data after receiving the second input data 214. In parallel, the real-time computation system can compute output data based on the third input data and the second scaling factor 216, and determine a third scaling factor based on the third input data 218. This process can continue for subsequently received input data.

Referring again to FIG. 1, the real-time computation system 102 can be implemented using analog hardware, digital hardware, programmable logic devices, a processor and software-based architecture, or some combination of these. In one embodiment, the computation system 102 can include a clock signal (not shown) which can be used to time the receipt of the input data 110 and the computation of the output data 112. The computation circuitry 104 and the scaling factor computation circuit 106 can operate based on this clock signal.

Figure 3:
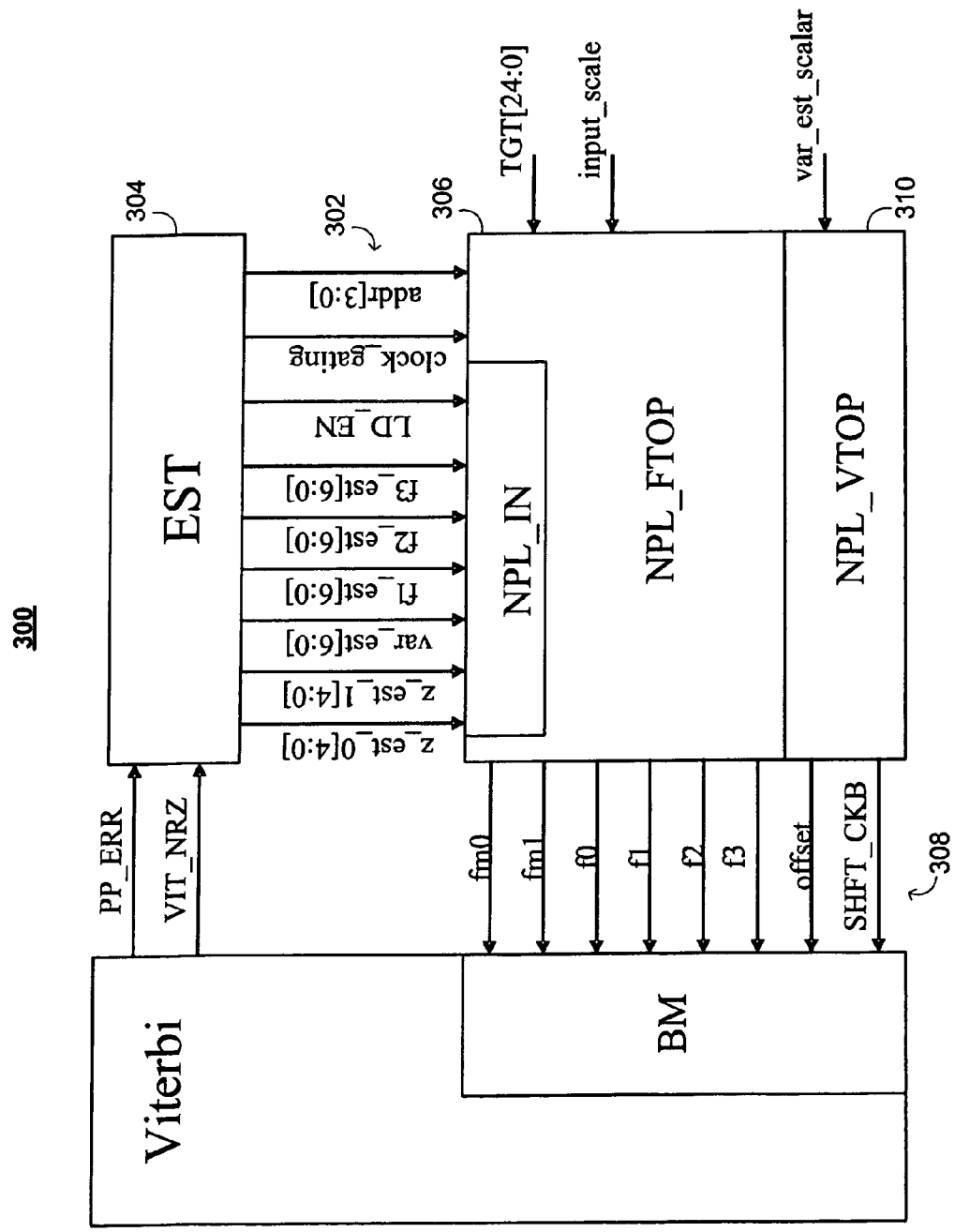
FIG. 3 is a block diagram of an exemplary statistical signal processing system that implements a non-linear Viterbi detector.

Referring now to FIG. 3, there is shown an exemplary real-time computation system 300 that implements non-linear Viterbi detection, which can be used in communication/storage systems where noise correlation occurs. The illustrated non-linear Viterbi detection system 300 is one example of a statistical signal processing system which incorporates an aspect of the present invention. As used herein, the term "statistical signal processing system" refers to a system that generates or evaluates the statistical properties of a signal (i.e., mean, variance, etc.) while processing that signal. The non-linear Viterbi detection operates based on parameters 302 provided by a channel estimation block 304, which include, for example, z_est_0, z_est_1, var_est, f1_est, f2_est, and f3_est. These parameters 302 are input values to two computation circuits 306, 310 that produce output values 308 based on these input values 302. As shown in the illustration, the output values 308 include fm0, fm1, f0, f1, f2, f3, and offset. The computation circuits 306, 310 operate based on a scaling factor that is provided by a scaling factor computation circuit, which is part of the NPL_VTOP computation circuit 310. More particularly, the scaling factor computation circuit determines a scaling factor based on the input values var_est, which are estimated noise variance values corresponding to different filters used in non-linear Viterbi detection. The scaling factor computation circuit will be described in more detail in connection with FIGS. 5-6.

As an example of the computations involved in non-linear Viterbi detection, suppose a Viterbi trellis has thirty-two branches, which can be labeled by $[a_{k-4}, a_{k-3}, a_{k-2}, a_{k-1}]$. In non-linear Viterbi, each of the thirty-two branches has a filtered mean and a non-linear filter. However, branches labeled by $[a_{k-4}, a_{k-3}, a_{k-2}, a_{k-1}]$ and $[\bar{a}_{k-4}, a_{k-3}, a_{k-2}, a_{k-1}, a_k]$ share the same filter tap values. Therefore, there are sixteen pairs of distinct filter taps. Using the input parameters 302, output parameter values 308 are computed for each trellis branch, as shown below.

$$fm = \text{fm\_est} \times \sqrt{\frac{\text{var\_min}}{\text{var\_est}}}, \quad (1)$$

where $$\text{fm\_est} = \text{z\_est} + c_0 + \sum_{i=1}^{3} c_{-i} f_{i\_est},$$

var_min is the scaling factor determined based on the previous input data, var_est is a noise variance estimate in the current input data, and $$c_i = \begin{cases} 4 \times \sum_{j=0}^{4} \frac{1}{2} a_{-i-j} t_j, & \text{for } i = 0 \\ 4 \times \sum_{j=0}^{3} \frac{1}{2} a_{-i-j} t_j, & \text{for } i = 1 \\ 4 \times \sum_{j=0}^{2} \frac{1}{2} a_{-i-j} t_j, & \text{for } i = 2 \\ 4 \times \sum_{j=0}^{1} \frac{1}{2} a_{-i-j} t_j, & \text{for } i = 3 \end{cases}$$

$$f_i = f_{i\_\text{est}} \times \sqrt{\frac{\text{var\_min}}{\text{var\_est}}}, \quad i = 0, 1, 2, 3, \quad (2)$$

where var_min is the scaling factor determined based on the previous input data, and var_est is a noise variance in the current input data.

In both equations (1) and (2), the parameter var_min is the scaling factor, which is determined based on a previous input data. As mentioned above herein, if the noise variance estimates in adjacent input data have similar characteristics, then the scaling factors determined based on the adjacent input data should be similar. However, it is contemplated that the disclosed technology will also apply to situations where adjacent input data have different characteristics.

Figure 4:
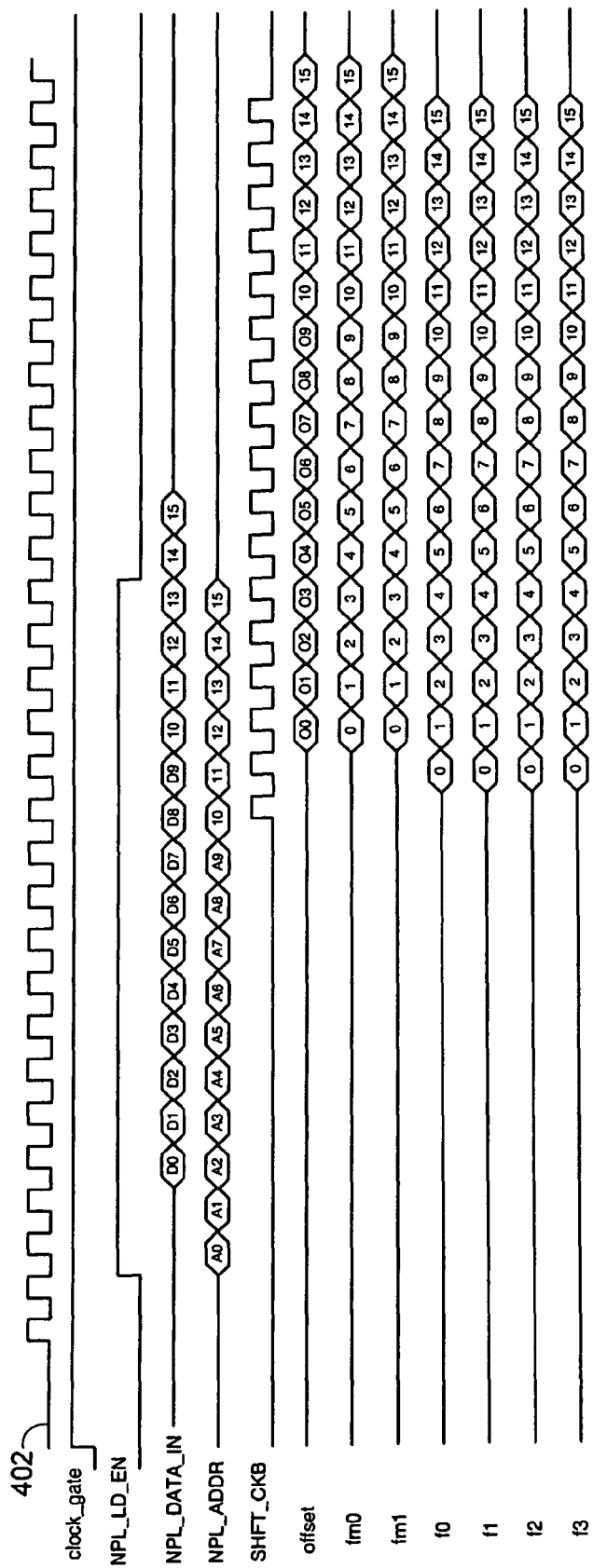
FIG. 4 is a diagram of exemplary computation timing for the statistical signal processing system of FIG. 3.

FIG. 4 shows a diagram of exemplary input data and output data timing for the computation circuits 306, 310. The computations are timed by a clock signal 402. In the diagram, the input values are represented as D0, D1, . . . , D15. For example, D0 represents one set of values z_est_0, z_est_1, var_est, f1_est, f2_est, and f3_est corresponding to a first filter, D1 represents a second set of input values corresponding to a second filter, and so on. Each set of inputs values corresponds to different filters used in non-linear Viterbi detection (not shown). The group of sixteen data sets D0, D1, . . . , D15 forms one input data. The output parameters offset, fm0, fm1, f0, f1, f2, and f3, are shown separately in the timing diagram. For each output parameter, e.g., offset, the output data O0 is computed based on input data D0 and a scaling factor, the output data O1 is computed based on input data D1 and the same scaling factor, and so on.

As shown in FIG. 4, and in accordance with one aspect of the invention, some output values are computed before the entire input data is received. For example, output data O0 is computed before input data D11 to D15 are received. This is possible because the scaling factor var_min used in computing the output data is not based on the immediate input data D0 to D15. Rather, as described above herein, the scaling factor var_min used in computing O0 to O15 is based on a previous input data (not shown).

Figure 5:
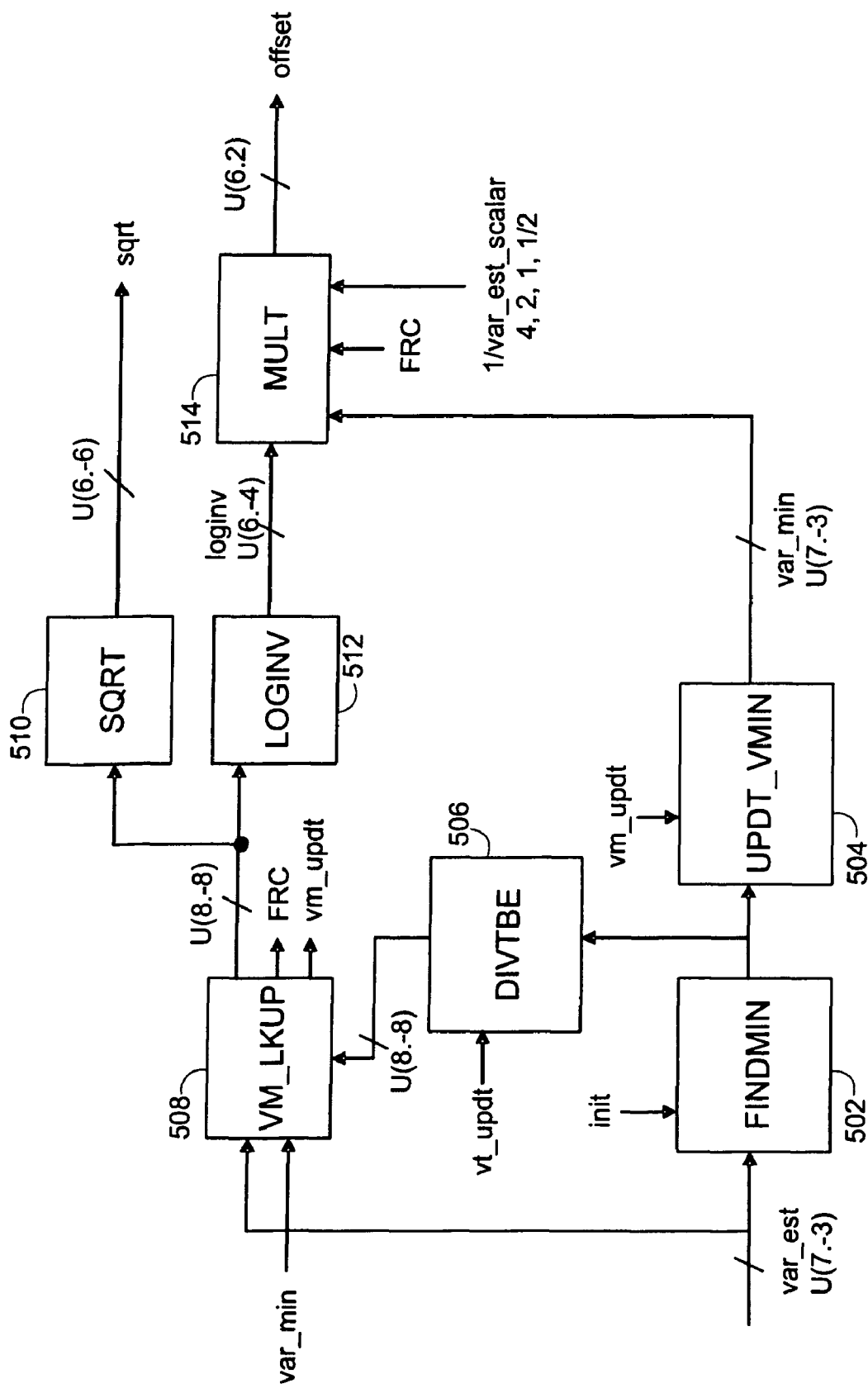
FIG. 5 is a more detailed block diagram of the statistical signal processing system of FIG. 3.

Referring now to FIG. 5, and in accordance with one aspect of the invention, there is shown a block diagram of an exemplary implementation of the NPL_VTOP computation circuit 310 of FIG. 3. As described above herein, the computation circuit 310 includes a scaling factor computation circuit 502 which determines a scaling factor based on the input values var_est, which are estimated noise variance values corresponding to different filters used in non-linear Viterbi detection. Among these var_est values, the illustrated scaling factor computation circuit 502 determines the smallest of the var_est values. This smallest value is the scaling factor to be used for a next input data and is stored in a scaling factor memory 504. The scaling factor can be stored in the memory 504 when the signal vm_updt is asserted. In parallel with the scaling factor computation, other blocks in the computation circuit also use the input values var_est to compute the output values, in accordance with equations (1) and (2) above. Some of these other blocks will now be described.

As shown above herein, each of equations (1) and (2) includes the factor $$\sqrt{\frac{var\_min}{var\_est}},$$

where each var_est is an input value in the current input data and var_min is the scaling factor determined based on a previous input data. Typically, a divide operation is the longest path in hardware design. Therefore, computing the factor $$\sqrt{\frac{var\_min}{var\_est}}$$

can be time intensive.

In accordance with one aspect of the invention, a statistical signal processing system can implement a division operation using a look-up table to reduce the time involved in computing the values $$\frac{var\_min}{var\_est}.$$

With continuing reference to FIG. 5, the look-up table in the illustrated computation circuit is part of the DIVTBE block 506. The table can include a particular number of table locations, and each table location can correspond to a distinct number. For example, a table can include one-hundred twenty-eight table locations, which can correspond to the numbers 1, 2, 3, . . . , 127, 128. In one embodiment, the total number of table locations can be at least $2^w$, where w is the number of bits in the whole part of a var_est parameter having bit precision U(w·–d). Therefore, in the example above, the one-hundred twenty-eight tables locations correspond to w≦7. In one embodiment, the table can be implemented using an addressable memory, such as random access memory.

In accordance with one aspect of the invention, the DIVTBE block 506 can include table initialization circuitry that computes the value $$\frac{var\_min}{k}$$

for each table location, where var_min is a scaling factor, and k is the distinct value associated with a table location. Therefore, the table initialization circuitry in block 506 can compute $$\frac{var\_min}{128}$$

for table location k=128, $$\frac{var\_min}{127}$$

for table location k=127, and so on. The circuitry that computes the k values $$\frac{var\_min}{k}$$

can be very efficient at computing these values to initialize the table. In one embodiment, the time required to initialize the table can be less than the time required to compute $$\frac{var\_min}{var\_est}$$

using a divider circuit, for all of the values var_est in an input data. The table initialization circuit can have parallel stages that each initializes a portion of the table, and each stage can have a pipelined architecture, for example.

In accordance with one aspect of the invention, the illustrated circuit of FIG. 5 includes a table look-up circuit 508 that accesses the table locations in the table. The table look-up circuit 508 can receive the noise variance values var_est and can access the table locations that correspond to the values of var_est to access the quotients $$\frac{var\_min}{var\_est}.$$

As mentioned above herein, the table can be implemented using an addressable memory, for example. In one embodiment, the table look-up circuit 508 can compute a table location address based on a var_est value and can access the table memory using the address. In one embodiment, multiplexers can be used to access the table. In one embodiment, the table look-up circuit can be implemented in two pipeline stages, where the first stage involves computing an address, and the second stage involves accessing and returning a quotient from a table location.

In accordance with one aspect of the invention, the DIVTBE block 506 updates its table using a var_min value from the scaling factor computation circuit 502 only when the signal vt_updt is asserted. In one embodiment, the signal vt_updt is asserted only after all of the var_est values in an input data have been received, and after the table look-up circuit 508 identifies the quotients in the table corresponding to these var_est values. The vt_updt signal cannot be asserted until the scaling factor computation circuit 502 determines the new scaling factor, which does not become finalized until all of the values var_est in the input data are received. The table initialization circuit in the DIVTBE block 506 updates the quotients in the table in time to be used by the var_est values in the next input data.

The outputs of the table look-up circuit 508 are the values $$\frac{\text{var\_min}}{\text{var\_est}}.$$

The SQRT block 510 computes the square root of these values to provide $$\sqrt{\frac{\text{var\_min}}{\text{var\_est}}}.$$

In one embodiment, the square root block 510 can be implemented using three pipeline stages, where the first two stages include carry save adders and the third stage includes a carry ripple adder. The values $$\sqrt{\frac{\text{var\_min}}{\text{var\_est}}}$$

are used in equations (1) and (2) described above herein.

The outputs of the table look-up circuit 508 are also used by a LOGINV circuit 512. The LOGINV circuit 512 computes a log of a reciprocal, so that if an input to the LOGINV block 512 is x, the output of the LOGINV circuit 512 is log(1/x). Therefore, the LOGINV circuit 512 produces the values $$\log\left(\frac{\text{var\_est}}{\text{var\_min}}\right).$$

In one embodiment, the LOGINV circuit 512 can be implemented using three pipeline stages, where the first two stages include carry save adders and the third stage includes a carry ripple adder. The values $$\log\left(\frac{\text{var\_est}}{\text{var\_min}}\right)$$

and the scaling factor var_min enter a multiplication circuit 514, which multiply these values to compute the offset parameter sent to the non-linear Viterbi detector (as shown in FIG. 3). In one embodiment, the multiplication circuit 514 can be implemented using an unsigned array multiplier. In one embodiment, the multiplication circuit 514 can be implemented in four pipeline stages.

Figure 6:
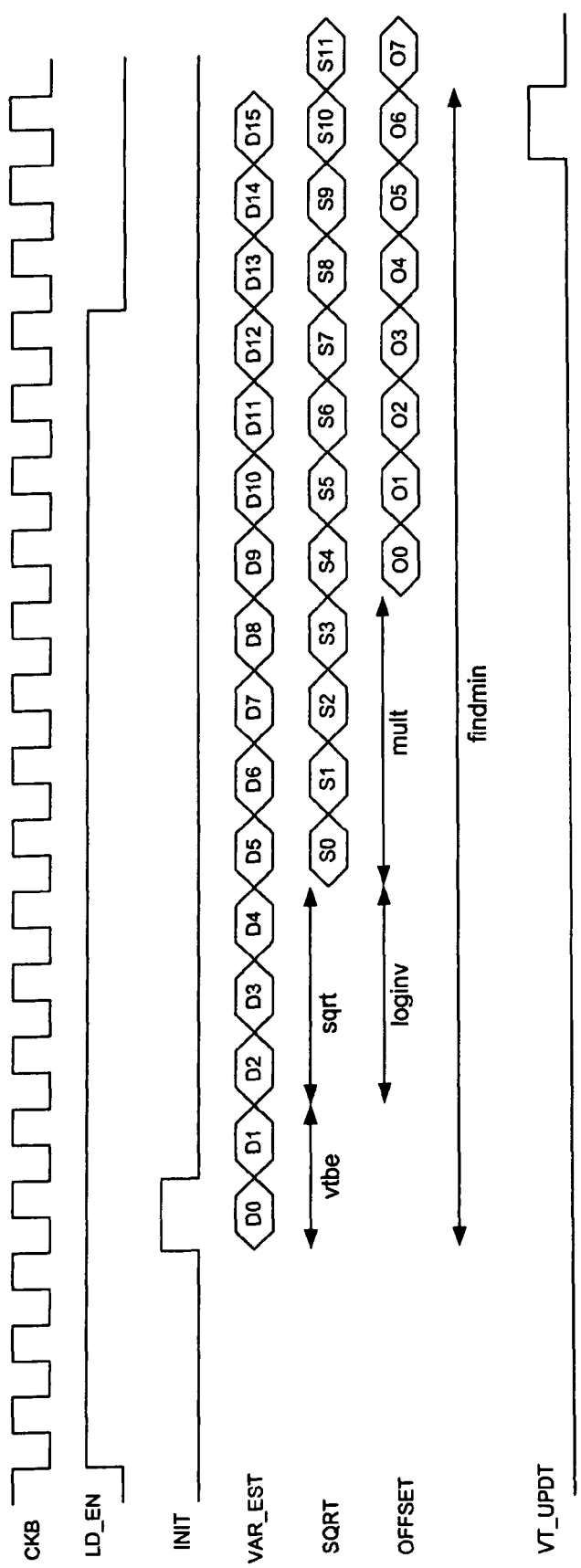
FIG. 6 is a diagram of exemplary computation timing for the statistical signal processing system of FIG. 5.

Referring now to FIG. 6, there is shown a diagram of the timings of computations in the computation circuit of FIG. 5. In the illustration, there are sixteen var_est values in each input data. The sixteen var_est values are shown as D0, D1, . . . , D15. A mentioned herein, the table look-up can be implemented as two pipelined stages, the square root operation can be implemented as three pipelined stages, the LOG-INV operation can be implemented as three pipelined stages, and the multiplication operation can be implemented as four pipelined stages. In one embodiment, each pipeline stage can complete its operation in one clock cycle. Accordingly, in the timing diagram, the table look-up operation (vtbe) uses two clock cycles, the square root operation (sqrt) uses three clock cycles, the loginv operation uses three clock cycles, and the multiplication operation (mult) uses four clock cycles. The scaling factor computation circuit determines the scaling factor by finding the minimum var_est value. Accordingly, the scaling factor computation (findmin) over sixteen clock cycles corresponding to the sixteen values D0, D1, . . . , D15. As described above herein, the table initialization circuit cannot update the table until the new scaling factor is determined, which is after value D15 is received. Accordingly, the signal vt_updt is asserted only after D15 is received and the scaling factor determination is completed. The table initialization operation occurs for the period of time used to compute all of the quotients for the table. However, the table initialization operation is completed before the next input data uses the quotient values in the table.

Accordingly, what has been described is a system and method for scaling parameters in a real-time computation system. In one aspect of the invention, a scaling factor that is used in connection with an input data can be determined based on a previous input data. In one aspect of the invention, a statistical signal processing system can implement a division operation involving a scaling factor by using a look-up table.

Referring now to FIGS. 7A-7G, various exemplary implementations of the present invention are shown.

Figure 7A:
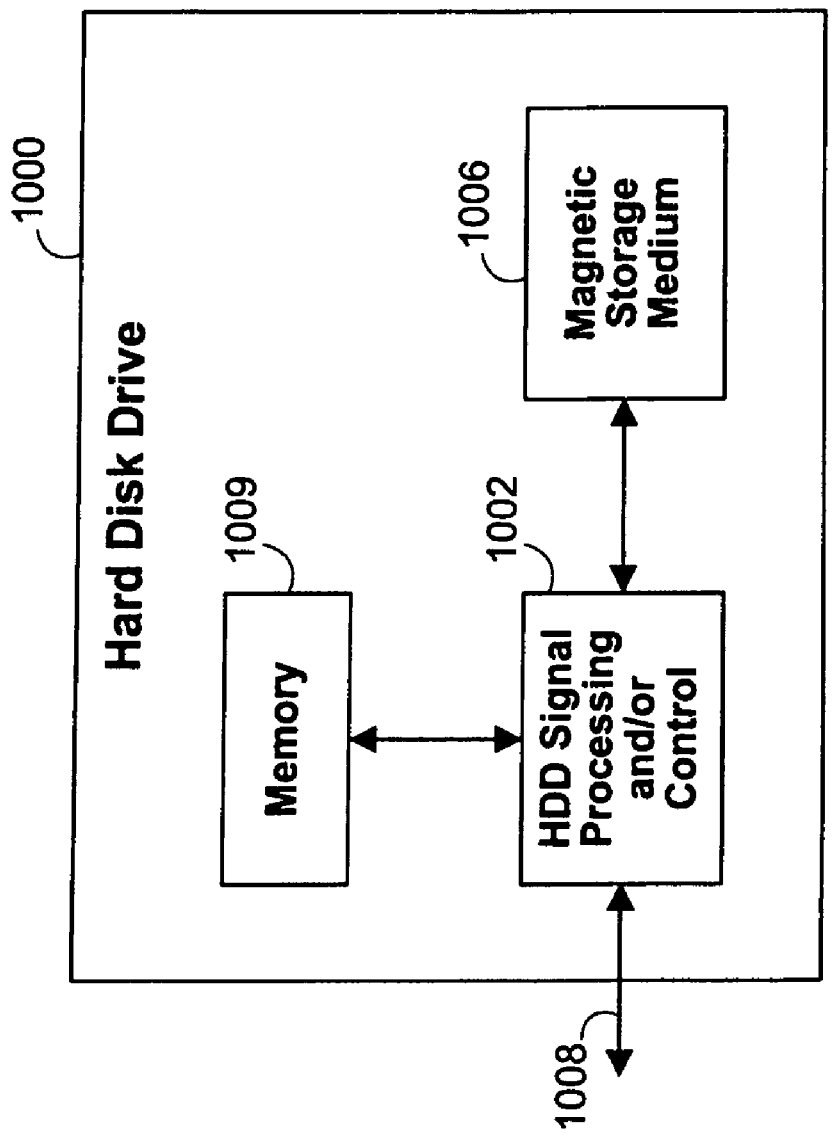
FIG. 7A is a block diagram of an exemplary hard disk drive that can employ the disclosed technology.

Referring now to FIG. 7A, the present invention can be implemented in a hard disk drive 1000. The present invention may implement either or both signal processing and/or control circuits, which are generally identified in FIG. 7A at 1002. In some implementations, the signal processing and/or control circuit 1002 and/or other circuits (not shown) in the HDD 1000 may process data, perform coding and/or encryption, perform calculations, and/or format data that is output to and/or received from a magnetic storage medium 1006.

The HDD 1000 may communicate with a host device (not shown) such as a computer, mobile computing devices such as personal digital assistants, cellular phones, media or MP3 players and the like, and/or other devices via one or more wired or wireless communication links 1008. The HDD 1000 may be connected to memory 1009 such as random access memory (RAM), low latency nonvolatile memory such as flash memory, read only memory (ROM) and/or other suitable electronic data storage.

Figure 7B:
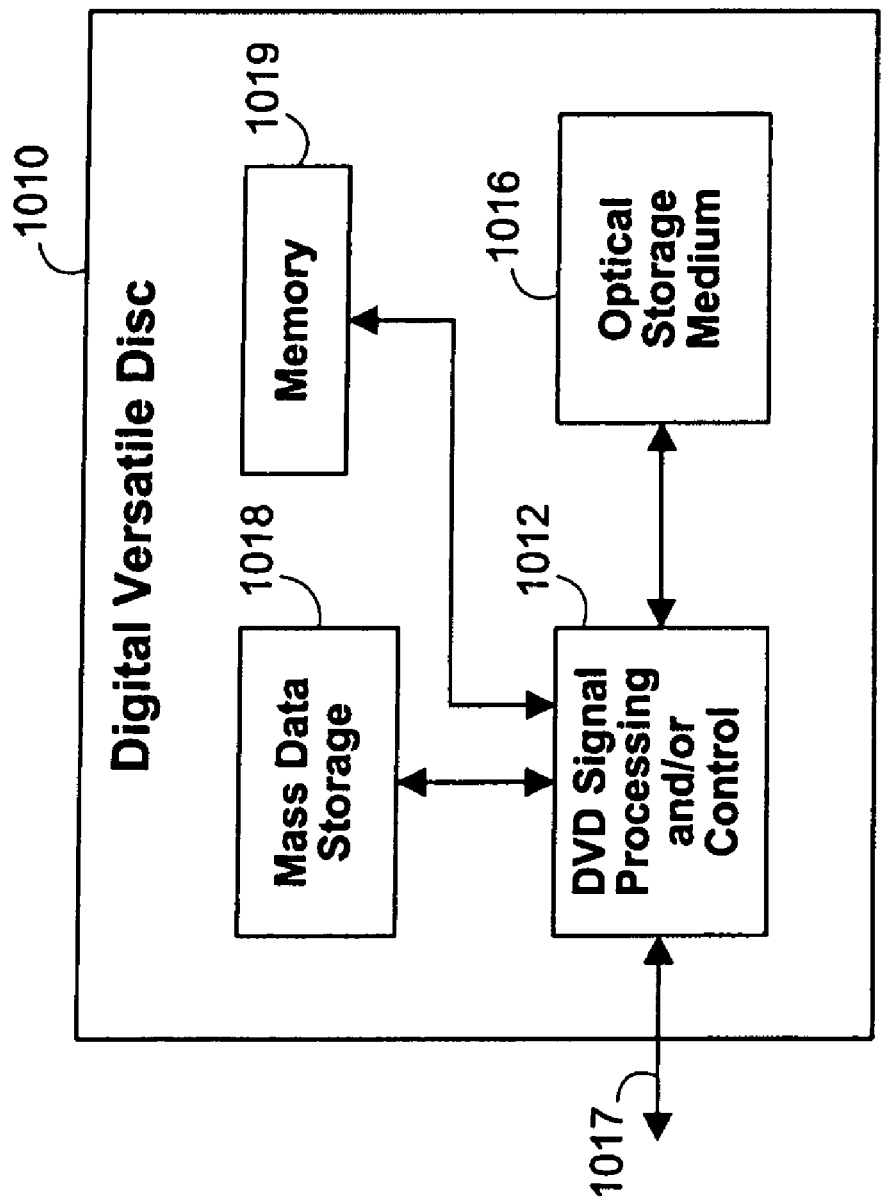
FIG. 7B is a block diagram of an exemplary digital versatile disc that can employ the disclosed technology.

Referring now to FIG. 7B, the present invention can be implemented in a digital versatile disc (DVD) drive 1010. The present invention may implement either or both signal processing and/or control circuits, which are generally identified in FIG. 7B at 1012, and/or mass data storage of the DVD drive 1010. The signal processing and/or control circuit 1012 and/or other circuits (not shown) in the DVD 1010 may process data, perform coding and/or encryption, perform calculations, and/or format data that is read from and/or data written to an optical storage medium 1016. In some implementations, the signal processing and/or control circuit 1012 and/or other circuits (not shown) in the DVD 1010 can also perform other functions such as encoding and/or decoding and/or any other signal processing functions associated with a DVD drive.

The DVD drive 1010 may communicate with an output device (not shown) such as a computer, television or other device via one or more wired or wireless communication links 1017. The DVD 1010 may communicate with mass data storage 1018 that stores data in a nonvolatile manner. The mass data storage 1018 may include a hard disk drive (HDD). The HDD may have the configuration shown in FIG. 7A. The HDD may be a mini HDD that includes one or more platters having a diameter that is smaller than approximately 1.8". The DVD 1010 may be connected to memory 1019 such as RAM, ROM, low latency nonvolatile memory such as flash memory and/or other suitable electronic data storage.

Figure 7C:
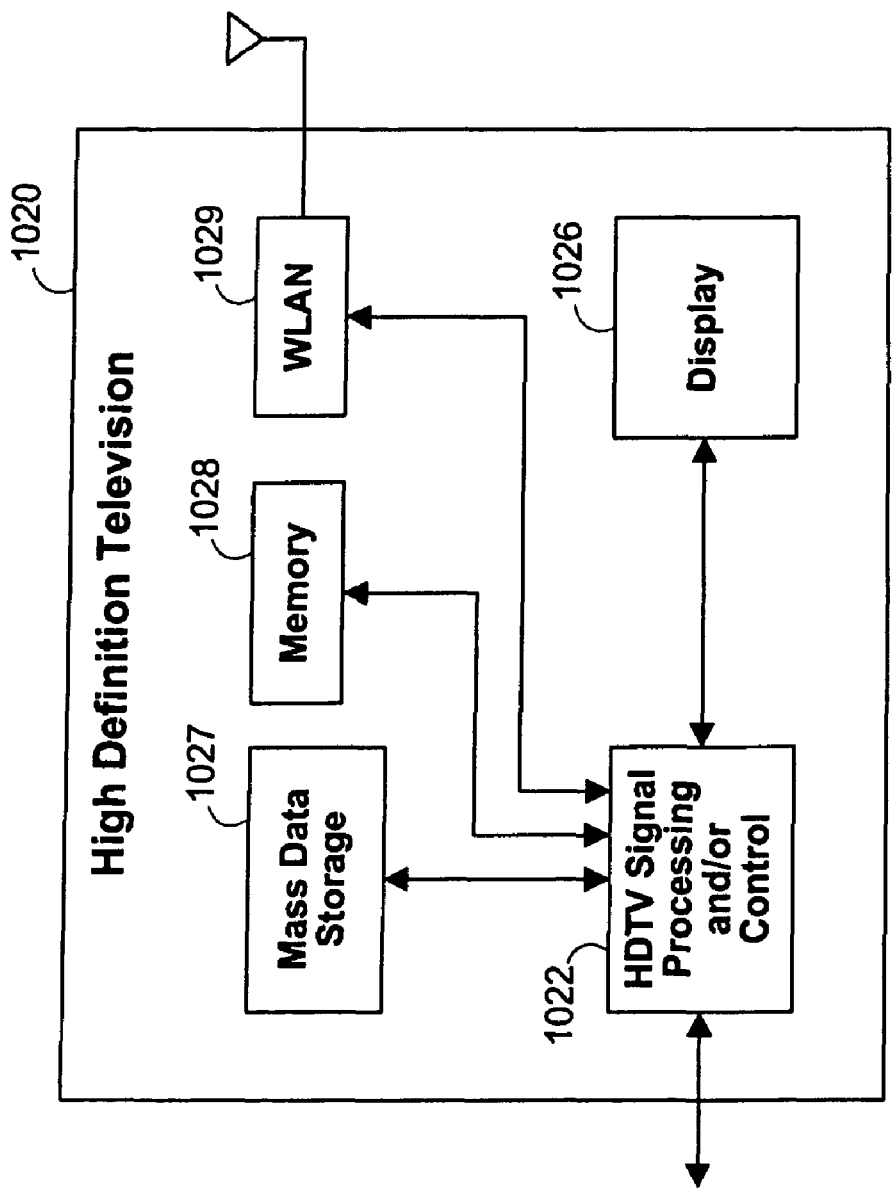
FIG. 7C is a block diagram of an exemplary high definition television that can employ the disclosed technology.

Referring now to FIG. 7C, the present invention can be implemented in a high definition television (HDTV) 1020. The present invention may implement either or both signal processing and/or control circuits, which are generally identified in FIG. 7C at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. At least one HDD may have the configuration shown in FIG. 7A and/or at least one DVD may have the configuration shown in FIG. 7B. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 7D:
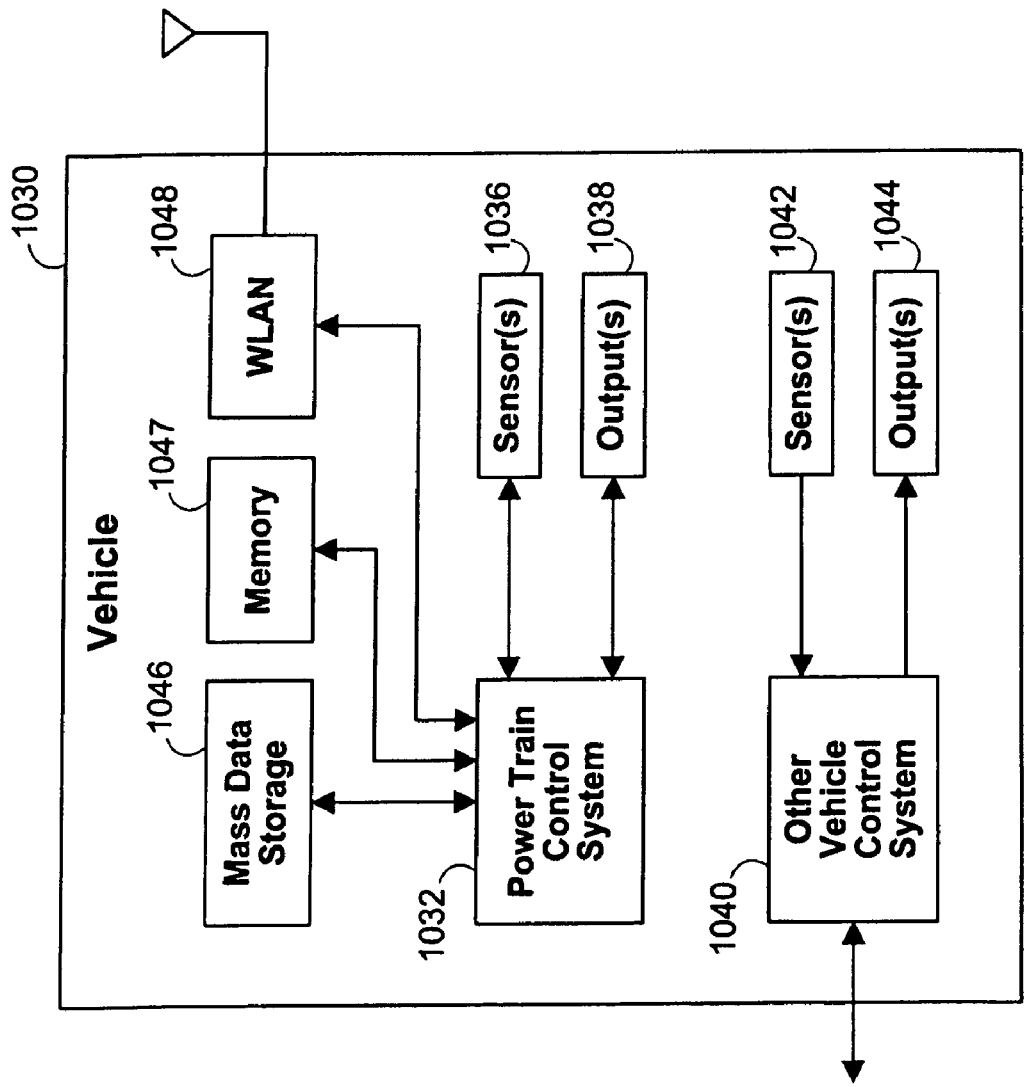
FIG. 7D is a block diagram of an exemplary vehicle that can employ the disclosed technology.

Referring now to FIG. 7D, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 7E:
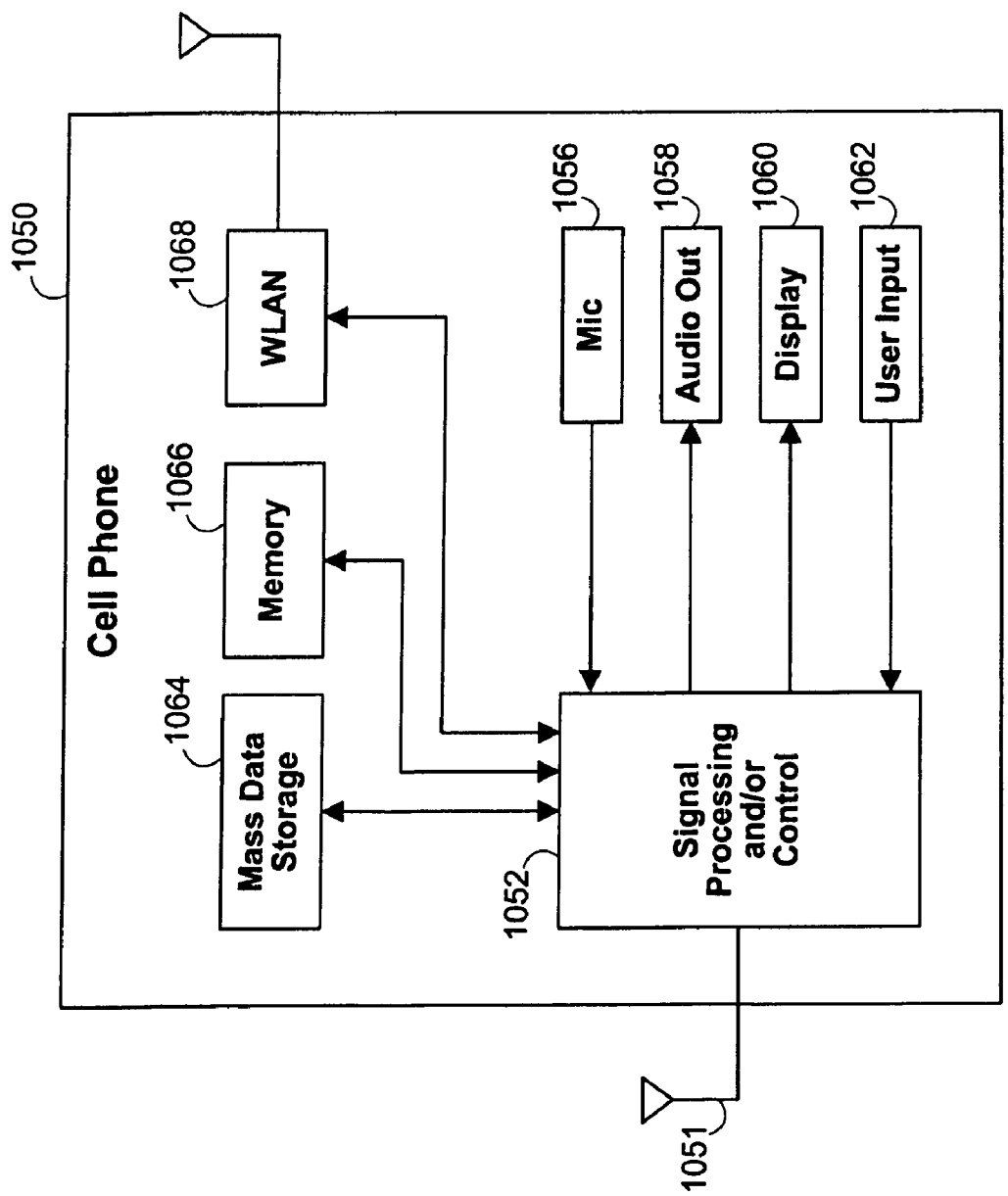
FIG. 7E is a block diagram of an exemplary cell phone that can employ the disclosed technology.

Referring now to FIG. 7E, the present invention can be implemented in a cellular phone 1050 that may include a cellular antenna 1051. The present invention may implement either or both signal processing and/or control circuits, which are generally identified in FIG. 7E at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 7F:
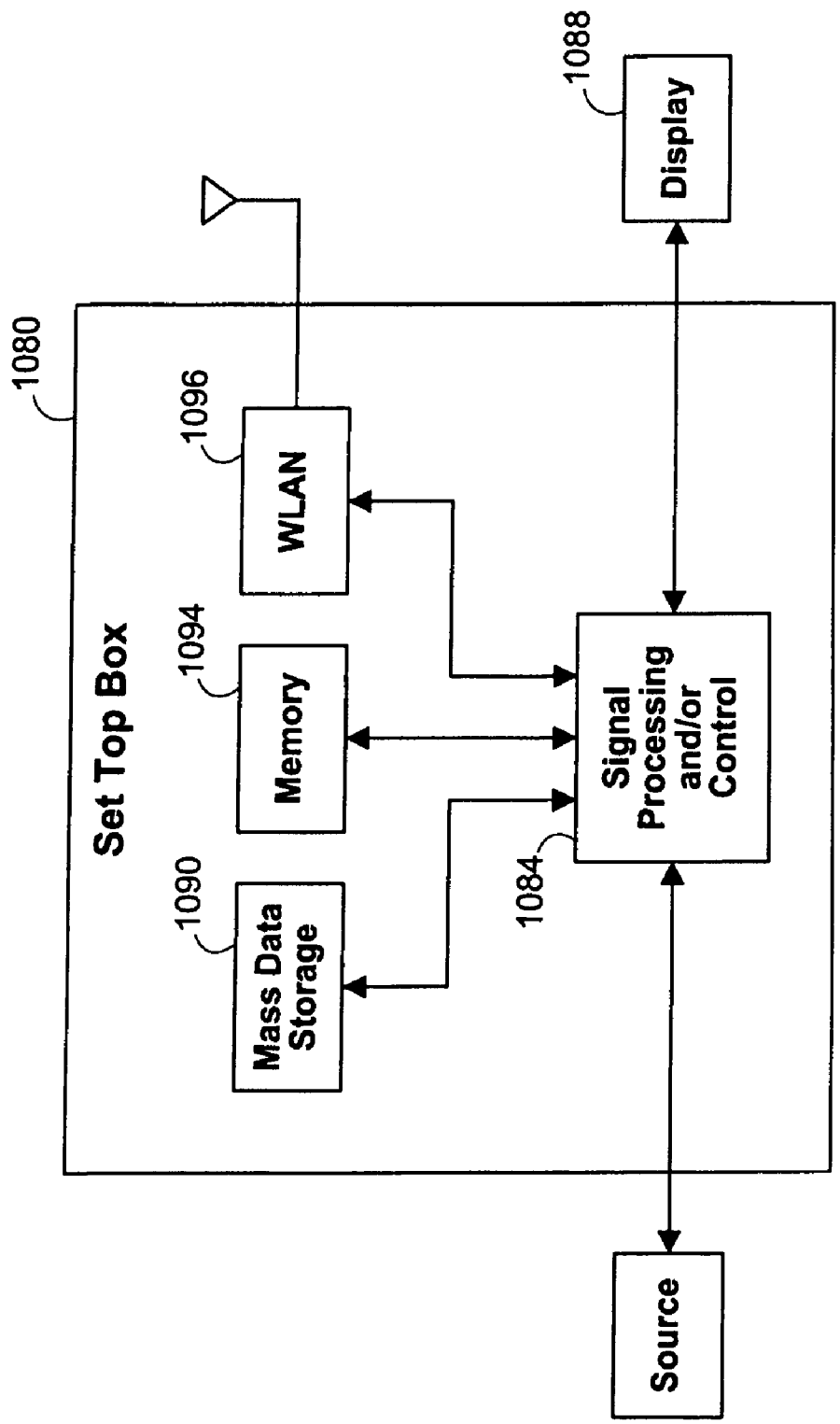
FIG. 7F is a block diagram of an exemplary set top box that can employ the disclosed technology.

Referring now to FIG. 7F, the present invention can be implemented in a set top box 1080. The present invention may implement either or both signal processing and/or control circuits, which are generally identified in FIG. 7F at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 7G:
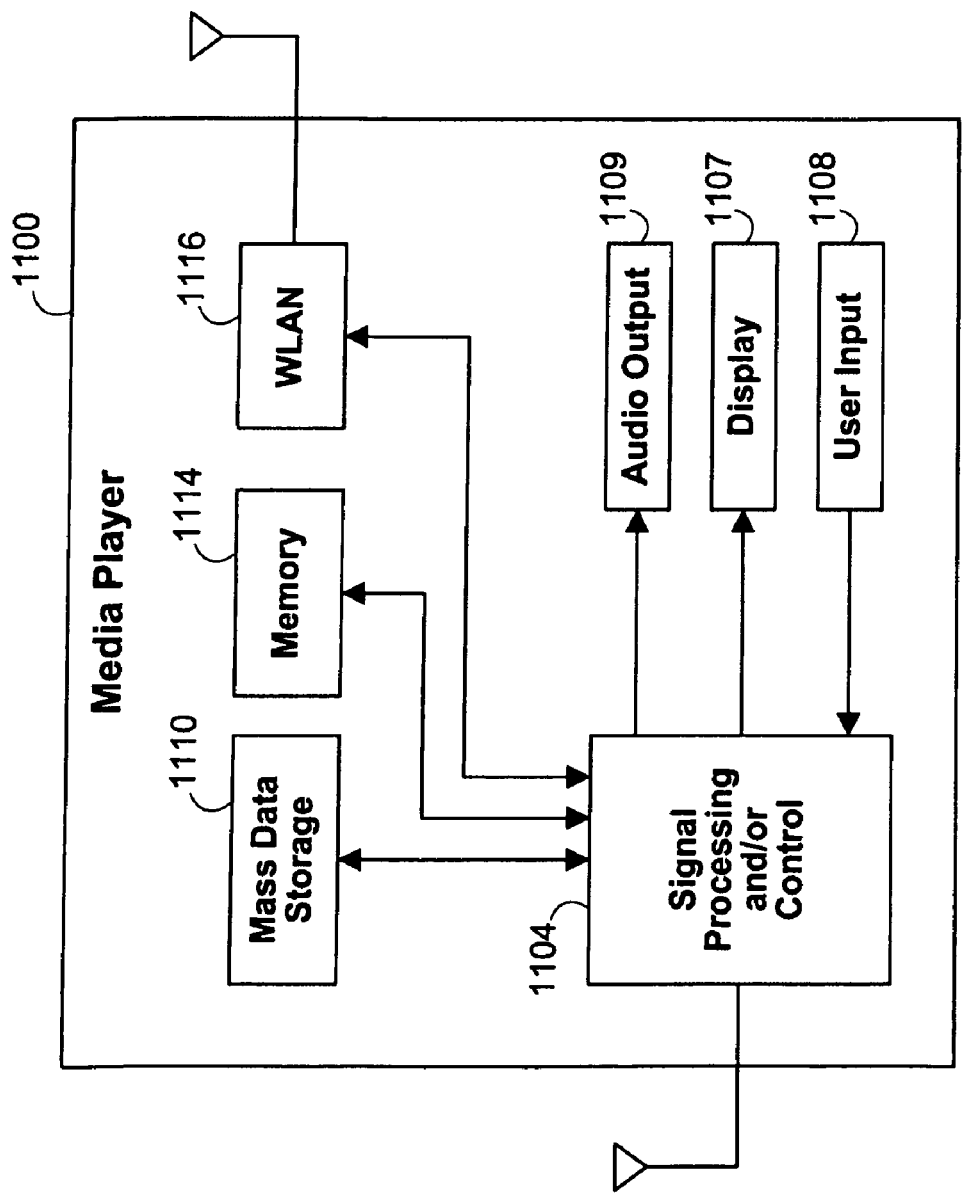
FIG. 7G is a block diagram of an exemplary media player that can employ the disclosed technology.

Referring now to FIG. 7G, the present invention can be implemented in a media player 1100. The present invention may implement either or both signal processing and/or control circuits, which are generally identified in FIG. 7G at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Accordingly, what have been described are a system and method for scaling parameters in a real-time computation system. The disclosed circuits, components, and methods can be implemented using means such as digital circuitry, analog circuitry, and/or a processor architecture with programmable instructions. Additionally, components and/or methods that store information or carry signals can operate based on electrical, optical, and/or magnetic technology, and can include devices such as flip-flops, latches, random access memories, read-only memories, CDs, DVDs, disk drives, or other storage or memory means. The disclosed embodiments and illustrations are exemplary and do not limit the scope of the disclosed technology as defined by the following claims.

What is claimed is:

1. A method for scaling values in a real-time computation system, the method comprising:
   receiving a first data comprising a first plurality of estimates of noise variance values;
   determining, by a scaling factor computation circuit, a first scaling factor based on a smallest one of the first plurality of estimates of noise variance values;
   receiving a second data after receiving the first data, wherein the second data comprises a second plurality of estimates of noise variance value; and
   performing in parallel:
      computing, by a computation circuit, output data based on the first scaling factor and the second data using a ratio of (i) the smallest one of the first plurality of estimates of noise variance values to (ii) one of the second plurality of estimates of noise variance values, wherein computing the output data comprises computing, in real time, parameters for the second data based on the first scaling factor associated with the first data, and
      determining a second scaling factor based on the second data.

2. The method of claim 1, further comprising:
   receiving a third data after receiving the second data; and
   performing in parallel:
      computing output data based on the second scaling factor and the third data, and
      determining a third scaling factor based on the third data.

3. The method of claim 1, wherein:
   the real-time computation system performs non-linear Viterbi detection;
   the estimates of noise variance values correspond to different filter values in the Viterbi detection; and
   the output values are non-linear Viterbi detection parameters.

4. The method of claim 1, further comprising:
   computing a plurality of values based on the first scaling factor and a plurality of predetermined values; and
   storing the plurality of values in a memory.

5. The method of claim 4, wherein computing output data based on the first scaling factor and the second data comprises:
   computing a memory address based on the second data; and
   accessing the memory based on the memory address to access one of the plurality of values.

6. The method of claim 5, further comprising:
   computing a plurality of second values based on the second scaling factor and the plurality of predetermined values; and
   storing the plurality of second values in the memory.

7. The method of claim 6, further comprising:
   receiving a third data after receiving the second data;
   computing a second memory address based on the third data; and
   accessing the memory based on the second memory address to access one of the plurality of second values.

8. The method of claim 7, wherein the plurality of values and the plurality of second values are quotients.

9. A real-time computation system comprising:
   an input connection that receives a first data comprising a first plurality of estimates of noise variance values and a second data after receiving the first data, wherein the second data comprises a second plurality of estimates of noise variance value;
   a scaling factor memory that stores a first scaling factor;
   a scaling factor computation circuit in communication with the scaling factor memory, wherein the scaling factor computation circuit determines the first scaling factor based on a smallest one of the first plurality of estimates of noise variance values; and
   a computation circuit in communication with the scaling factor memory, wherein the computation circuit computes output data based on the second data and the first scaling factor in the scaling factor memory using a ratio of (i) the smallest one of the first plurality of estimates of noise variance values to (ii) one of the second plurality of estimates of noise variance values, wherein the computation circuit computes the output data by computing, in real time, parameters for the second data based on the first scaling factor associated with the first data, and wherein the scaling factor computation circuit and the computation circuit operate in parallel.

10. The system of claim 9, wherein the scaling factor computation circuit comprises selection circuitry that selects one of the first plurality of estimates of noise variance values in the data.

11. The system of claim 10, wherein the selection circuitry comprises circuitry that selects the smallest one of the first plurality of estimates of noise variance values.

12. The system of claim 11, wherein:

the real-time computation system is a non-linear Viterbi detection system;

the estimates of noise variance values correspond to different filter values in the Viterbi detection; and the output values are non-linear Viterbi detection parameters.

13. The system of claim 9, further comprising:

a memory initialization circuit that computes a plurality of values based on the scaling factor and a plurality of predetermined values; and a second memory comprising the plurality of values.

14. The system of claim 13, wherein the computation circuit is in communication with the second memory, the computation circuit comprising:

circuitry that computes a memory address based on the data; and circuitry that accesses the second memory based on the memory address to access one of the plurality of values.

15. The system of claim 14, wherein the plurality of values are quotients.

16. The method of claim 1, wherein:

determining the first scaling factor comprises computing, in real time, the first scaling factor in a first real-time computation based on the first data; and computing the output data comprises computing, in real time, parameters for the second data in a second real-time computation based on the first scaling factor.

17. A method for scaling values in a real-time computation system, the method comprising:

receiving a first data comprising a first plurality of estimates of noise variance values;

determining, by a scaling factor computation circuit, a first scaling factor based on a smallest one of the first plurality of estimates of noise variance values;

receiving a second data after receiving the first data, wherein the second data comprises a second plurality of estimates of noise variance value; and performing in parallel:

computing, by a computation circuit, output data based on the first scaling factor and the second data using a ratio of (i) the smallest one of the first plurality of estimates of noise variance values to (ii) one of the second plurality of estimates of noise variance values, and determining a second scaling factor based on the second data, wherein computing the output data comprises computing detection parameters for the second data based on the smallest one of the first plurality of estimates of noise variance values associated with the first data.

* * * * *